(No Model.)
C. W. OLDHAM.
FEED FOR COTTON PLANTERS.
No. 365,195. Patented June 21, 1887.
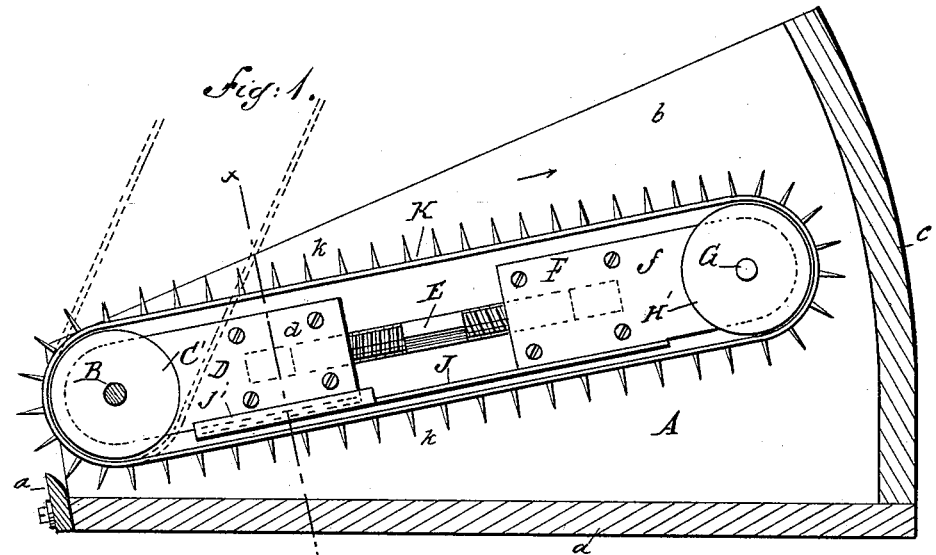
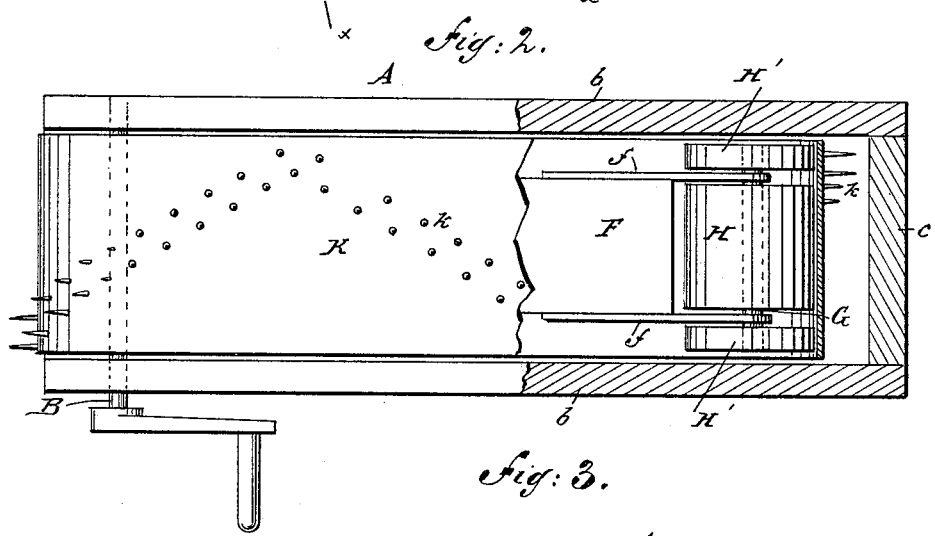
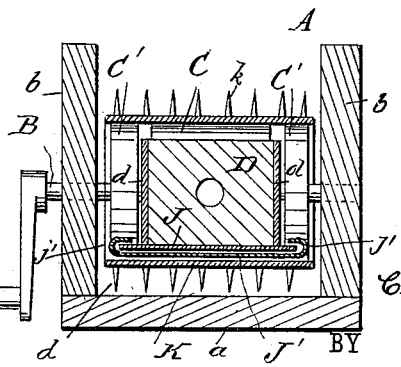
WITNESSES:
INVENTOR:
C. W. Oldham
BY Munn & Co
ATTORNEYS.

United States Patent Office.

CHARLES W. OLDHAM, OF MITCHELL, INDIANA.

FEED FOR COTTON-PLANTERS.

SPECIFICATION forming part of Letters Patent No. 365,195, dated June 21, 1887.

Application filed April 28, 1887. Serial No. 236,462. (No model.)

*To all whom it may concern:*

Be it known that I, CHARLES W. OLDHAM, of Mitchell, in the county of Lawrence and State of Indiana, have invented a new and Improved Feed for Cotton-Planters, of which the following is a full, clear, and exact description.

Reference is to be had to the accompanying drawings, forming a part of this specification, in which similar letters of reference indicate corresponding parts in all the figures.

Figure 1 is a sectional elevation of a hopper and feed constructed in accordance with my invention. Fig. 2 is a broken plan view of the same, and Fig. 3 is a transverse sectional elevation taken on the line $x\ x$ of Fig. 1.

The invention will first be described in connection with the drawings, and then pointed out in the claims.

The hopper A is composed of the bottom $a$, side pieces, $b\ b$, and back piece, $c$. At or near the front of the hopper is journaled the crank-shaft B, on which is secured the drum C and the two side wheels or drums, $C'\ C'$. A block, D, is attached to the shaft B by the cheek-pieces $d\ d$. Connected to this block by the right and left hand screw-rod E, is the block F, which is provided with the cheek-pieces $f\ f$, in the outer ends of which is journaled the shaft G. On this is placed a drum, H, and two side wheels, $H'\ H'$. The blocks D F are kept in alignment by the plate J, secured to the block F, and flanged plate $J'$, secured to the block D. The plate J fits between the flanges $j'\ j'$ of the plate $J'$, and prevents lateral displacement, and permits longitudinal adjustment of the block F to and from the block D by turning the screw-rod E. The parts thus far described form a frame in the hopper A, pivoted at the front upon the crank-shaft B. Upon this frame and over the drums is placed the endless feed-belt K, which is caused to travel in the direction of the arrow when the said crank-shaft is revolved. The said endless belt is provided with the outwardly-projecting teeth $k$, which carry the seed from the hopper over the projection $d$, secured to the front end of the bottom $a$. The belt K therefore rests upon the mass of seeds in the hopper and feeds off from the upper surface of the mass of seeds, the frame and belt lowering in the hopper as the mass diminishes.

The hopper is filled with seed by lifting the frame and feed-belt out of the hopper to the position indicated by the dotted lines in Fig. 1.

Having thus fully described my invention, I claim as new and desire to secure by Letters Patent—

1. The combination, with the hopper A, of a feed-belt and frame placed in the hopper to constantly rest upon the seed therein and feed from the top of the mass of seed, substantially as described.

2. The hopper A, provided with the shaft B, in combination with a frame pivoted upon said shaft and provided with the endless feed-belt K, substantially as described.

3. The block D, attached to the shaft B, and the drums placed upon the shaft, in combination with the block F, shaft G, and drums placed thereon, and the endless belt K, substantially as described.

4. The block D, attached to the shaft B, and the drums placed upon the shaft, in combination with the rod E, block F, shaft G, drums placed thereon, and the endless belt K, substantially as described.

5. The blocks D F, adjustably connected together, the shaft B and its drums, and the shaft G and its drums, in combination with the endless feed-belt K, substantially as described.

6. The blocks D F, connected to the shafts B G, and drums placed thereon, and the adjusting-rod E, in combination with the belt K, the plate J, and flanged plate $J'$, substantially as described.

CHARLES W. OLDHAM.

Witnesses:
EDWARD P. EVERSOLE,
JOHN B. LARKIN.